United States Patent [19]

Trott et al.

[11] 4,328,569

[45] May 4, 1982

[54] ARRAY SHADING FOR A BROADBAND CONSTANT DIRECTIVITY TRANSDUCER

[75] Inventors: W. James Trott, Annandale, Va.; Jacek Jarzynski, Bethesda, Md.

[73] Assignee: The United States of America as represented by the Secretary of the Navy, Washington, D.C.

[21] Appl. No.: 94,269

[22] Filed: Nov. 14, 1979

[51] Int. Cl.[3] .............................................. H04B 13/00

[52] U.S. Cl. ....................................... 367/103; 67/153

[58] Field of Search ................. 367/103, 87, 118, 153, 367/156, 165

[56] References Cited

U.S. PATENT DOCUMENTS 3,805,226 4/1974 Halloway ........................... 367/157

4,156,863 5/1979 Madison ............................. 367/165

OTHER PUBLICATIONS

Jarzynski et al, "Array Shading for a . . . Transducer", 11/10/78, pp. 1266-1269, J. Acoust. Soc. Am., vol. 64, #5.

Trott, "Design Theory for a . . . Transducer", 9/75, NRL Report 7933, ntis AD-AO 18 052list, 11/15/75.

Rogers et al, "New Approach to a . . . Transducer", 7/78, pp. 34-43, J. Acoust. Soc. Am., vol. 64, #1.

Van Buren, "Design Manual for a . . . Interim Report," 10/11/79, NRL Report 8329, pp. 1-34.

*Primary Examiner*—Nelson Moskowitz

*Attorney, Agent, or Firm*—Robert S. Sciascia; William T. Ellis; Alan P. Klein

[57] ABSTRACT

A broadband directional transducer which provides a beam pattern that is essentially constant for all frequencies above a certain cutoff frequency, an acoustic pressure angular distribution that is virtually independent of the distance from the transducer and no side lobes, includes an array of isophase, omnidirectional electroacoustic elements on a spherical shell, each element being amplitude-shaded according to the shading function $$S_n(\theta) = \frac{n}{2(2n+1)}\cos^n\theta + \tfrac{1}{2}\cos^{n+1}\theta + \frac{n+1}{2(2n+1)}\cos^{n+2}\theta$$

where n is a positive integer, and $\theta$ is an angle measured from the axis of the spherical surface to a shaded element.

7 Claims, 3 Drawing Figures

ARRAY SHADING FOR A BROADBAND CONSTANT DIRECTIVITY TRANSDUCER

BACKGROUND OF THE INVENTION

This invention relates generally to acoustic transducers for underwater and ultrasonic applications and more particularly to a broadband directional transducer which provides a constant beamwidth that is independent of frequency over its bandwidth and which produces both an azimuthal pressure distribution that is independent of the distance from the transducer and a beam pattern that has no side lobes.

A constant beamwidth transducer, that is, a transducer whose beam pattern is independent of frequency over a wide frequency range, is desirable for many applications in ultrasonics and underwater acoustics. Some examples of possible applications for such a transducer are: broadband echo ranging, high data rate communication, and nondestructive ultrasonic testing, medical diagnosis and materials research.

Most directional acoustic transducers and arrays exhibit beam patterns which are frequency-dependent; for example, the beamwidth of a plane piston or line array decreases with increasing frequency. As a result, the spectral content of a transmitted or received signal varies with location in the beam. Thus, the fidelity of an underwater acoustic system depends on the relative orientation of the transmitter and receiver. A broadband directional transducer having a beam pattern that is constant for all frequencies over its bandwidth and exhibiting very low sidelobes is desirable, therefore, because the spectral content of the acoustic signal of such a constant beamwidth transducer is independent of the bearing of the transducer. Also, most directional sound projectors feature substantial sidelobes in their beam patterns. Since these sidelobes are unwanted for most applications, a transducer with negligible sidelobes is desirable.

A number of authors (R. P. Smith, Acustica 23, 21–26 (1970); D. G. Tucker, Nature (London) 180, 496 (1957); J. C. Morris and E. Hands, Acustica 11, 341–347 (1961); and J. C. Morris, Journal of Sound and Vibration 1, 28–40 (1964)) have developed CBT's but these transducers include arrays of elements which are either interconnected by elaborate filters (R. P. Smith), compensating networks (R. P. Smith), or delay lines (D. G. Tucker; J. C. Morris and E. Hands), or are deployed in a complicated three-dimensional pattern (J. C. Morris) thereby making the transducers more suitable as receivers than transmitters. Moreover, all of these transducers exhibit constant beamwidths over a limited bandwidth.

Most directional transducers exhibit a complicated acoustic pressure distribution in the region near the transducer. Such a pressure distribution changes rapidly with the distance from the transducer. Many applications of these transducers require that the observation point be in the rapidly changing region. However, this creates substantial difficulties in correctly interpreting the resulting data. It is desirable, therefore, to have a directional transducer which produces an acoustic pressure distribution that is virtually independent of the distance from the transducer and thereby eliminates any regions having a rapid change in pressure distribution in the near field.

Many directional piezoelectric sound projectors feature a 6 dB rise in transmitting current response (TCR) for each octave increase in frequency below resonance. However, it is desirable to produce for all input frequencies the same level of acoustic pressure amplitude for a given input current and such a constant level requires a flat TCR with respect to frequency. To obtain such a TCR for many transducers, the input current to those transducers must be compensated.

SUMMARY OF THE INVENTION

The general purpose and object of the present invention is to provide a source of sound which has an essentially constant beam pattern for all frequencies above a certain cutoff frequency, the beam pattern possessing virtually no sidelobes, and which has an angular acoustic pressure distribution that is virtually independent of distance from the transducer. This and other objects of the present invention are accomplished by an array of isophase, omnidirectional electro-acoustic elements on a spherical shell, each element being amplitude-shaded according to the shading function $$S_n(\theta) = \frac{n}{2(2n+1)}\cos^n\theta + \tfrac{1}{2}\cos^{n+1}\theta + \frac{n+1}{2(2n+1)}\cos^{n+2}\theta,$$

where n is a positive integer, and $\theta$ is an angle measured from the axis of symmetry of the spherical surface to a shaded element. Each element is a monopole source having a strength per unit area, the area being measured over the propagation surface at the element. The amplitude shading of the array is accomplished by varying the gain of each element as a function of the location of each element on the spherical surface.

The advantages of the present invention are: it provides a constant beamwidth which extends over a virtually unlimited frequency bandwidth; it exhibits negligible sidelobes; it involves a simpler, more effective method for achieving constant beamwidth properties; the acoustic surface pressure distribution, as well as the pressure distribution at all distances out to the far field, is approximately equal to the surface velocity distribution; the entire front surface of the transducer is uniformly acoustically loaded; the transducer having electro-acoustic elements of piezoelectric material features a broad bandwidth below resonance over which the transmitting current response is flat; all elements are driven in phase, that is, there are no filter crossover networks or delay lines; the elements are only shaded in amplitude in proportion to the shading function per unit area and the effective area of the element; and the array may be bi-directional (acoustically transparent spherical surface) or unidirectional (acoustically rigid spherical surface).

Other objects and advantages of the invention will become apparent from the following detailed description of the invention when considered in conjunction with the accompanying drawing wherein:

DETAILED DESCRIPTION OF THE INVENTION

Figure 1:
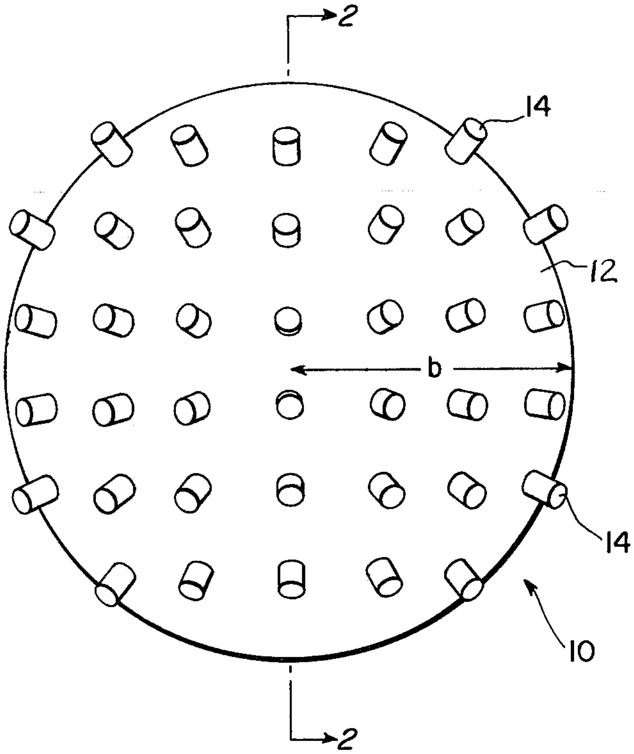
FIG. 1 is a view of the front surface of a spherically shaped transducer.

Referring now to the drawing, wherein like reference characters designate like or corresponding parts throughout the views, FIG. 1 shows the broadband constant-directivity transducer 10 in the form of a spherical shell 12. The transducer 10 includes an array of isophase, omnidirectional electro-acoustic elements 14 on the shell 12. The shell 12 may be formed from any material which is typically used to support an array of electroacoustic elements. For example, the shell 12 may be fabricated from thin rigid plastic, e.g., about 0.040-inch-thick polycarbonate material, such as LEXAN, which may be suitably drilled for locating the elements 14. The distribution of the elements 14 over the transducer 10 is uniform, that is, the spacing between elements is approximately constant and is less than 0.8 of a wavelength of the operational frequency. The elements 14 are small (less than $\lambda/2$) relative to the wavelength of the operational frequency.

Figure 2:
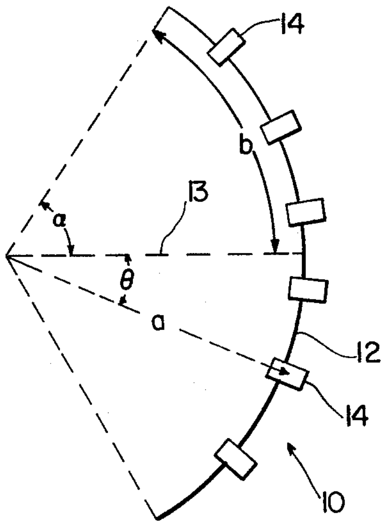
FIG. 2 is a cross-section taken along line 2—2 of FIG. 1 of the transducer.

As shown in FIG. 2 the transducer 10 has an arbitrary half-angle $\alpha$ which is measured from the axis of symmetry 13 of the transducer. The half-angle $\alpha$ may be $0<\alpha\leqq\pi$ for a unidirectional (acoustically rigid, spherical surface) transducer, but should be in the range $0<\alpha\leqq\pi/2$ for optimum performance of a bidirectional (acoustically transparent, spherical surface) transducer. A circumferential arc b, shown in FIGS. 1 and 2, subtends the half-angle $\alpha$. The arc b may be any suitable dimension and typically depends on the frequency bandwidth of operation, i.e., lower operating frequencies require a larger dimension than higher frequencies.

The angle $\theta$ is measured from the axis 13 of the shell to the center of an element 14.

The distance a is the spherical radius to the center of an element.

Each element is amplitude-shaded according to the shading function $$S_n(\theta) = \frac{n}{2(2n+1)}\cos^n\theta + \tfrac{1}{2}\cos^{n+1}\theta + \frac{n+1}{2(2n+1)}\cos^{n+2}\theta$$

where n=1, 2, 3 . . . and $0\leqq\theta\leqq\pi/2$ for acoustically transparent transducers, and n=0, 1, 2, 3, . . . and $0\leqq\theta\leqq\pi$ for acoustically rigid transducers. The higher the value of n, the narrower the beam. The narrower the beam, the better the signal to noise ratio, less interference, and more power in the direction of the beam. Thus, when a sinusoidal voltage is applied to the elements 14 the array vibrates with a velocity whose amplitude distribution over the shell is given by $S_n(\theta)$.

The sound energy radiated from the array of element 14 into a surrounding fluid medium provides an essentially constant beam pattern, uniform acoustic loading, and extremely low sidelobes for all frequencies above a cutoff frequency $f_c$. The cutoff frequency $f_c$ depends on the half-angle $\alpha$ and the dimension b, and can be obtained from the approximation $f_c=\mathbf{c}[1100+(919/\alpha)](1500b)$, where b is in meters, $\alpha$ is in radians and c is the sound speed of the surrounding fluid medium in meters per second. If the electro-acoustic elements 14 are of piezoelectric material, the transmitting current response (TCR) is nearly constant over the frequency range of the transducer from the cutoff frequency $f_c$ to the thickness resonance frequency of the material.

Figure 3:
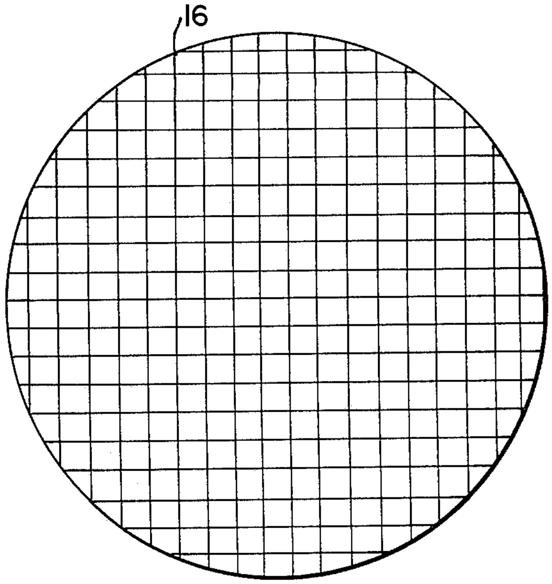
FIG. 3 is a view of the front surface of another embodiment of the spherically shaped transducer.

Standard techniques, in addition to that used for forming the transducer shown in FIGS. 1 and 2, for constructing transducer arrays which feature sidelobe suppression may be used for forming the broadband constant-directivity transducer. Planar arrays are generally constructed of discs or blocks of piezoelectric crystal or piezoceramic supported on thin strips of pressure-release material such as a material made from a cork-rubber substance, e.g. CORPRENE, or a rigid back. For the broadband constant-directivity transducer to be fabricated in this manner, a rigid spherical back is substituted for the planar rigid back. The front surface of such a transducer is shown in FIG. 3. This transducer,therefore, comprises a shell having piezoelectric material which is sectioned into a number of elements 16. Thus, the array of the transducer shown in FIG. 3 includes the sectional arrangement of piezoelectric elements 16 and each element is shaded according to the function $S_n(\theta)$. Other techniques such as dicing a spherically-shaped disc of piezoelectric material are applicable and are familiar to the art of transducer design. Shading a transducer, which is designed by the aforementioned techniques, according to the function $S_n(\theta)$ produces a broadband constant-directivity transducer whether the array is bidirectional or unidirectional. However, in the function $S_n(\theta)$, n=0, 1, 2, 3, . . . for a unidirectional array, whereas n=1, 2, 3 . . . for a bidirectional array as previously mentioned.

The shading function $S_n(\theta)$ is determined as follows:

In a continuous distribution of elements on an acoustically transparent spherical surface, each element, having an area dA, is a monopole source of strength $S(\theta_o)$ dA, where $S(\theta_o)$ is the source strength per unit area. The sources are amplitude-shaded, so S is a function of the polar angle $\theta_o$ of the area element. The acoustic pressure (from element dA) at some point r, outside the sphere is $$dP = -ikcp(eik|r_1-r_o|/|r_1-r_o|)S(\theta_o)dA, \quad (1)$$

where $r_o$ is the position vector of the area element dA, c and p are the sound speed and density, respectively, of the medium in which the array is immersed, and k is the wavenumber. All sources are assumed to radiate in phase at the same angular frequency $\omega$, and the $e^{-i\omega t}$ time factor is omitted from all expressions. It is convenient to work in spherical coordinates and accordingly, the Green's function in Eq. (1) is rewritten in terms of the spherical coordinates of $r_l$ and $r_o$. The total pressure at point r is $$P(r,\theta) = pck^2a\sum_{m=0}^{\infty} A_m j_m(ka)h_m(kr)P_m(\cos\theta), \quad (2)$$

where a is the radius of the sphere, $P_m(\cos\theta)$, is a Legendre polynomial, and $j_m$, $h_m$ are spherical Bessel and Hankel functions, respectively. It is convenient to take the beam axis as the reference direction for the polar angles $\theta$ and $\theta_o$. Also, the shading function is independent of the aximuthal angle $\phi$. Therefore, the coefficients $A_m$ in the above series are independent of $\theta$ and $\phi$, and are determined from the shading function as follows:

$$A_m = (m+\tfrac{1}{2})\int_0^{\pi} S(\theta_0)\,P_m(\cos\theta_0)\sin\theta_0\,d\theta_0. \quad (3)$$

The expression for the farfield pressure is obtained by taking the limit of Eq. (2) as $r \rightarrow \infty$, $$P_f(r,\theta) = pcka \frac{e^{ikr}}{r} \{[-A_1 j_1(ka) P_1(\cos\theta) + A_3 j_3(ka) P_3(\cos\theta) - \dots] + i[-A_0 j_0(ka) P_0(\cos\theta) + A_2 j_2(ka) P_2(\cos\theta) - \dots]\}. \quad (4)$$

For a constant beamwidth transducer the farfield pressure amplitude $|P_f|$ should be independent of ka over as wide a frequency range as possible. If ka is high enough so that the asymptotic form of $j_m(ka)$ may be used, then $$P_f(r,\theta) \rightarrow pce^{ikr}/r\{[A_1P_1(\cos\theta)+A_3P_3(\cos\theta)+\dots]\cos(ka) - i[A_oP_o(\cos\theta)+A_2P_2(\cos\theta)+\dots]\sin(ka)\}. \quad (5)$$

The shading function $S(\theta)$ can also be expanded as a series of Legendre polynomials. It is convenient to express $S(\theta)$ as the sum of an even part $S_e(\theta)$ (even with respect to the variable $\cos\theta$) and an odd part $S_o(\theta)$ where, $$S_e(\theta) = A_oP_o(\cos\theta) + A_2P_2(\cos\theta) + \dots,$$

and $$S_o(\theta) = A_1P_1(\cos\theta) + A_3P_3(\cos\theta) + \dots. \quad (6)$$

From Eqs. (5) and (6) it follows that the farfield pressure amplitude can be expressed as $$|P_f(r,\theta)| = (pc/r)[\{S_o(\theta)\cos(ka)\}^2 + \{S_e(\theta)\sin(ka)\}^2]^{\frac{1}{2}}. \quad (7)$$

If the shading function is chosen so that $$|S_o(\theta)| = |S_e(\theta)|,$$

Then, $$|P_f(r,\theta)| = (pc/r)|S_o(\theta)| \quad (8)$$

and is independent of ka.

It is important to know the values of ka for approximating a spherical Bessel function of order m by its asymptotic form. The asymptotic form applies when $(ka)^2 >> m^2 - \frac{1}{4}$. Thus, the higher the order n the higher the value of ka before $j_m(ka)$ approaches its asymptotic value. From this fact, and from the results presented in the previous paragraph, emerge the following two criteria for amplitude shading on an acoustically transparent sphere (to achieve constant beamwidth).

(i) Choose a shading function whose expansion, in Legendre polynomials, involves the least number of terms possible for the given beamwidth. Alternately, if $m_u$ is the highest-order term in Eq. (4) which makes an observable contribution to $p_f(r,\theta)$, choose $S(\theta)$, such that $m_u$ has the lowest possible value.

(ii) Choose $S(\theta)$ such that its odd and even parts are equal in magnitude. This criterion is automatically satisfied, if the shading function is finite in the upper hemisphere ($0 \leqq \theta \leqq \pi/2$) and zero in the lower hemisphere ($\pi/2 \leqq \theta \leqq \pi$). The only way to obtain $S(\theta)=0$ in the range $\pi/2 \leqq \theta \leqq \pi$ is for $S_o(\theta)$, $S_e(\theta)$ to be equal in amplitude but have opposite sign.

When criteria (i) and (ii) are satisfied, it follows from Eq. (8) that the beam pattern will be the same as the shading function. Therefore, to eliminate sidelobes it is necessary to choose an $S(\theta)$ which decreases smoothly to zero as a function of $\theta$.

According to Eq. (8) the beam pattern will be symmetrical about the $\theta=90°$ plane, with equal farfield pressure amplitude in the forward ($\theta=0°$) and back ($\theta=180°$) directions.

A convenient starting function is $\cos^n\theta$, which varies smoothly as a function of $\theta$ and, as shown below, simple linear combinations of powers of $\cos\theta$ can be developed which, to a very good approximation, satisfy criterion (ii). The simplest combination of powers of $\cos\theta$ which tends to zero in the lower hemisphere is $$f_n(\theta) = \tfrac{1}{2}(1+\cos\theta)\cos^n\theta. \quad (9)$$

In the lower hemisphere, $f_n$ has either a shallow maximum or a minimum depending on whether n is even or odd. The magnitude of this peak is small. For example, when n=1, the peak magnitude of $f_1(\theta)$, in the range $\pi/2 \leqq \theta \leqq \pi$, is 18 dB below the value of $f_1$ in the forward direction ($\theta \times 0°$); and as n increases, the cancellation between the two terms in $f_n(\theta)$ becomes even stronger. Further cancellation is achieved by forming a linear combination of $f_n(\theta)$ and $f_{n+1}(\theta)$ and choosing the coefficients, so that the peak value of $f_n(\theta)$ is exactly canceled by $f_{n+1}(\theta)$. Let $\theta'$ be the value of $\theta$ at which $f_n(\theta)$ has a maximum (or minimum) in the lower hemisphere. From Eq. (9) it follows that, $$\cos\theta' = -[n/(n+1)].$$

Let $r = |f_{n+1}(\theta')|/|f_n(\theta')|$ be the ratio of amplitudes of $f_{n+1}$ and $f_n$ at $\theta'$. Then the appropriate linear combination of $f_n$ and $f_{n+1}$, normalized to unity at $\theta=0°$, is $$S_n(\theta) = \frac{1}{1+r}[rf_n(\theta) + f_{n+1}(\theta)] = \frac{n}{2(2n+1)}\cos^n\theta + \tfrac{1}{2}\cos^{n+1}\theta + \frac{n+1}{2(2n+1)}\cos^{n+2}\theta. \quad (10)$$

This function is close to zero over the entire range $\pi/2 \leqq \theta \leqq \pi$. When n=1, the peak magnitude of $S_n(\theta)$ in the lower hemisphere is 36 dB below unity, and decreases further with increasing n.

The series expansion of $\cos^n\theta$ in Legendre polynomials involves only polynomials of order less than or equal to n. Thus, the highest order term in the series expansion of $S_n(\theta)$ is of order n+2. Beam patterns, for $S_n(\theta)$ shading, show a constant beamwidth and absence of sidelobes.

Obviously many more modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A transducer for transmitting and receiving acoustical energy in a surrounding fluid medium, and having an essentially constant beam pattern for all operating frequencies above a cutoff frequency, comprising:

a spherical shell having an axis of symmetry, said shell having a circumferential arc b subtending a half-angle $\alpha$, said half-angle $\alpha$ being measured from the axis of symmetry of said shell, said shell including an array of isophase, omnidirectional electroacoustic elements, each element being amplitude-shaded in accordance with $$S_n(\theta) = \frac{n}{2(2n+1)}\cos^n\theta + \tfrac{1}{2}\cos^{n+1}\theta + \frac{n+1}{2(2n+1)}\cos^{n+2}\theta,$$

where n is a positive integer, and $\theta$ is the angle measured from the axis of said shell to the center of the shaded element.

2. The transducer of claim 1, wherein said cutoff frequency is a function of the half-angle $\alpha$ and the arc b and can be obtained from the approximation $$f_c = c[1100+(919/\alpha)]/(1500\ \text{b}),$$

where b is in meters, $\alpha$ is in radians, and c is the sound speed of the surrounding fluid medium in meters per second.

3. The transducer of claim 1, wherein said elements are spaced about said shell, the spacing between elements being approximately constant.

4. The transducer of claim 1, wherein said elements are formed from piezoelectric material.

5. The transducer of claim 1, wherein said elements are small relative to the wavelength $\lambda$ (less than $\lambda/2$) of said acoustical energy.

6. The transducer of claim 1, wherein $0<\alpha\leqq\pi/2$, $n=1, 2, 3, \ldots$, and $0\leqq\theta\leqq\pi/2$ for a bidirectional transducer and $0<\alpha\leqq\pi$, $n=0, 1, 2, 3, \ldots$, and $0<\theta\leqq\pi$ for a unidirectional transducer.

7. The transducer of claim 3, wherein said spacing is less than 0.8 of a wavelength $\lambda$ of said acoustical energy.

* * * * *